Dec. 22, 1942.  K. ZWICK  2,305,824
FEELER DEVICE FOR COPYING MILLING MACHINES
Filed Jan. 27, 1938  2 Sheets-Sheet 1

Inventor:
KURT ZWICK,
by
Crumpston & Shepard
his attorneys

Dec. 22, 1942. K. ZWICK 2,305,824
FEELER DEVICE FOR COPYING MILLING MACHINES
Filed Jan. 27, 1938 2 Sheets-Sheet 2
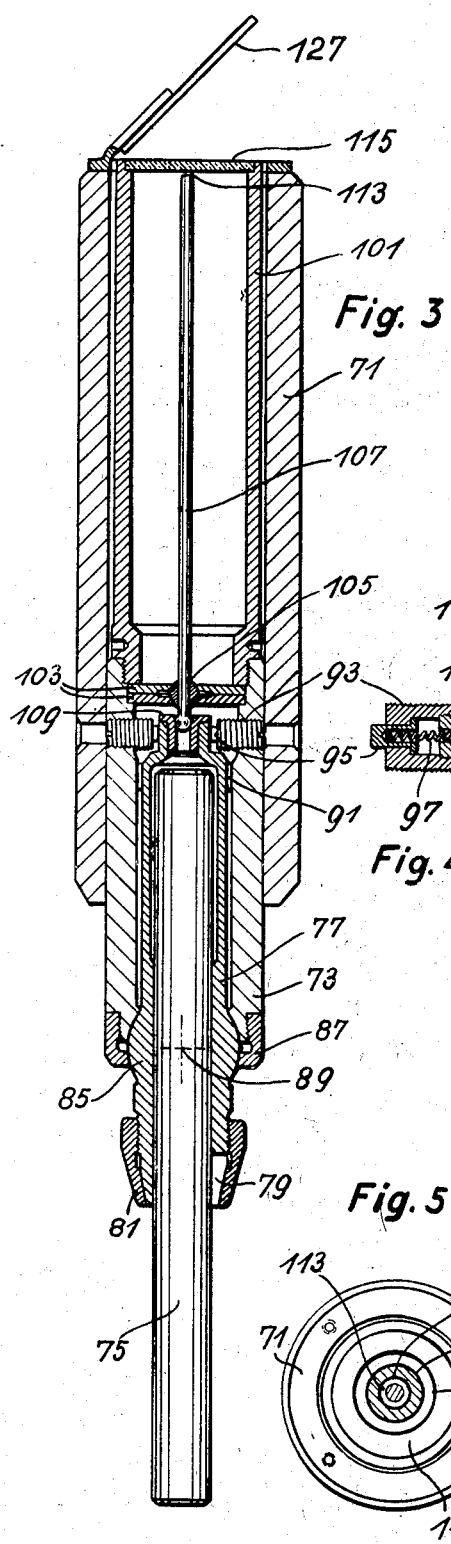
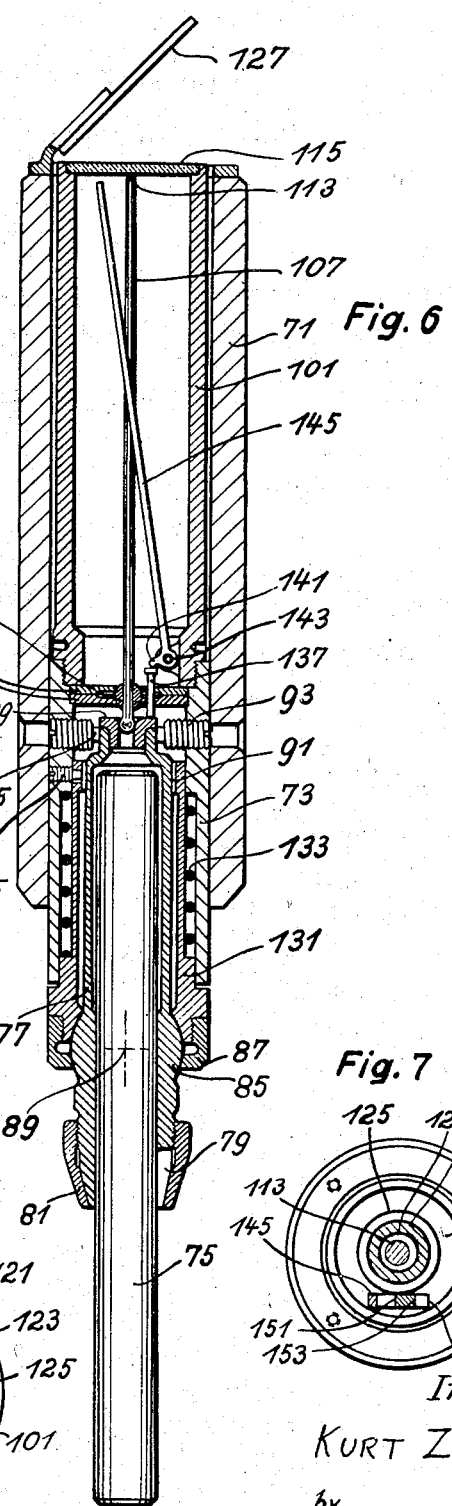
Inventor:
KURT ZWICK
by Cumpston & Shepard
his attorneys.

Patented Dec. 22, 1942

2,305,824

UNITED STATES PATENT OFFICE 2,305,824

FEELER DEVICE FOR COPYING MILLING MACHINES

Kurt Zwick, Munich, Germany; vested in the Alien Property Custodian

Application January 27, 1938, Serial No. 187,256
In Germany February 5, 1937

16 Claims. (Cl. 90—62)

This invention relates to a copying milling machine or machine for reproducing on one or more pieces of work stock the configuration of a pattern or sample. The reproduction may be made on the same scale as the pattern or sample or on a reduced or enlarged scale.

During the rough milling or cutting operation, while the work or reproduction is being milled to approximate size and before the final smooth finishing thereof, it is desirable that the movements of the cutter be actuated by some kind of feeding means other than direct manual pressure, in order to save useless fatigue of the operator. Such feeding means may, for example, be in the form of a manually driven screw feed, or may be driven by motor or power means of known form.

The mold or pattern to be copied is frequently made of soft or fragile material, or has thin or narrow projecting parts which may be easily broken by excessive pressure. It is desirable that some means be provided for notifying the operator when the tracing stylus or feeling member comes into contact with the pattern or mold, so that the operator may stop the movement of the cutting tool and the tracing stylus in the direction in which they were previously being moved, to avoid damage to the pattern which might easily be caused by the heavy feeding force of manual screw feed means or of power feeding means, and which might even be caused under some conditions by direct manual pressure.

It has heretofore been suggested that this notification to the operator be accomplished by electrical means. In one known form of device, the tracing stylus is displaced by contact with the pattern and this closes an electric circuit to give an audible or visible signal to the operator. In another known form, the pattern is made of electrical conducting material and when the tracing stylus comes into contact with it a circuit is completed so that a signal is given. These prior known devices are not satisfactory, however, because they are cumbersome in use, and expensive to build and to keep in order, and because it is often difficult and expensive to make the pattern of electrical conducting material. Moreover, these prior arrangements have the grave disadvantage that they indicate to the operator merely the fact of engagement of the tracing stylus with the pattern, without giving any indication of the direction of the contact pressure, or of the extent thereof.

It is an object of the present invention to provide a simple and inexpensive feeler device or tracing stylus assembly which will indicate to the operator not only the fact of engagement with the pattern, but also the direction of the contacting pressure, or the extent or intensity of such pressure, or preferably both the direction and the extent thereof.

Another object of the invention is the provision of such a device which operates entirely through mechanical as distinguished from electrical parts and which requires no electrical circuit.

A further object is the provision of such a device of simple and compact form which can be readily substituted on existing copying or milling machines for existing tracing stylus assemblies.

To these and other ends the invention resides in certain improvements and combinations of parts, all as will be hereinafter more fully described, the novel features being pointed out in the claims at the end of the specification.

In the drawings:

Fig. 3 is a vertical section through a feeler device or tracing stylus assembly constructed in accordance with one embodiment of the present invention;

Fig. 4 is a longitudinal section through a part of the device;

Fig. 5 is a plan view of the construction shown in Fig. 3, with the mirror removed;

Fig. 6 is a view similar to Fig. 3 showing a modified form of construction, and

Fig. 7 is a plan view of the construction shown in Fig. 6, with the mirror removed.

The same reference numerals throughout the several views indicate the same parts.

Figure 1:
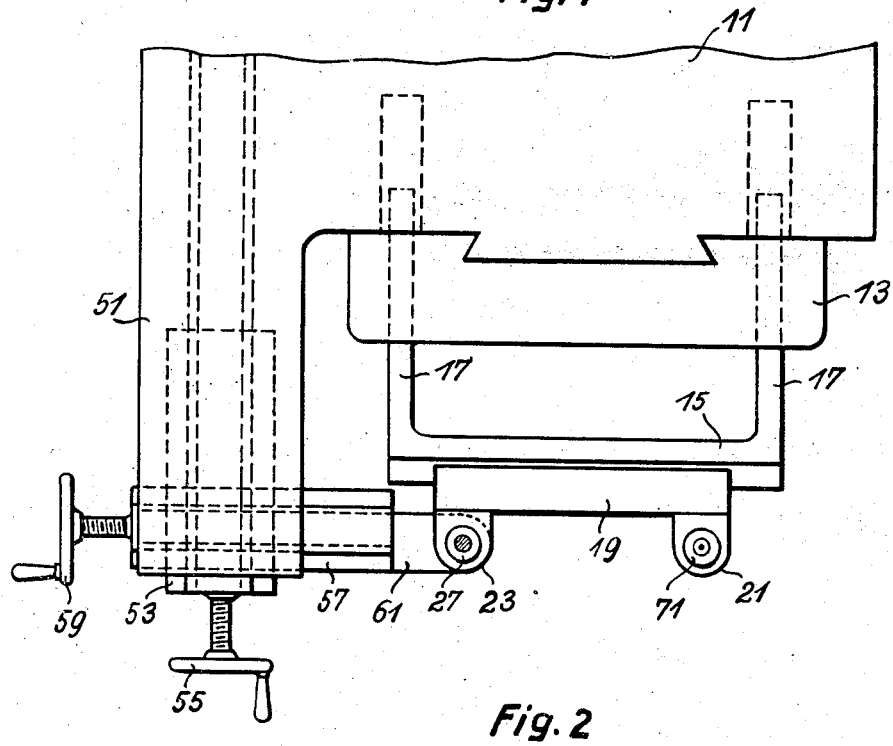
Fig. 1 is a diagrammatic plan of a typical copying milling machine with which the present invention may be used.
Figure 2:
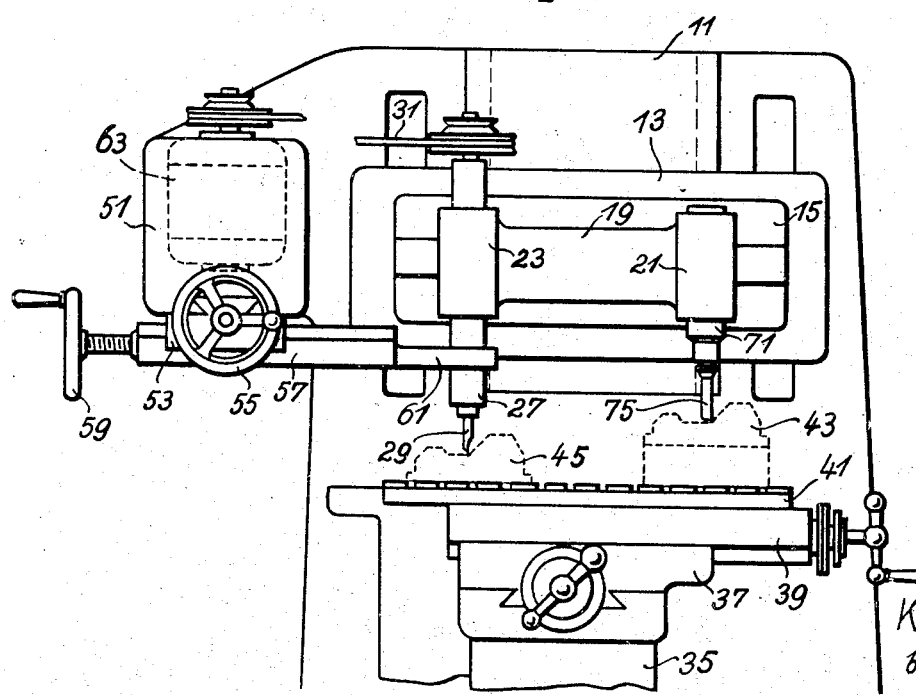
Fig. 2 is a front elevation thereof.

Referring now to Figs. 1 and 2 of the drawings, there is shown somewhat diagrammatically one of the many forms of copying milling machines with which the present invention may be used. The machine may include, for example, a frame or standard 11 on which a member 13 is vertically slidable, this member 13 being suitably counterweighted to counterbalance all or any desired part of the weight of the member 13 and other parts supported therefrom. A beam 15 is mounted on the member 13 for movement in the direction of the arms 17 of this beam, the arms guiding the beam so that all positions thereof are parallel to each other. A second beam 19 is mounted on the beam 15 for horizontal movement in a direction transverse to the arms 17. Thus the beam 19 is universally movable in all directions throughout the range of movement of the machine. It may move to left or right when viewed as in Fig. 1, by moving along its guideway on the beam 15. It may move toward and away from the frame or support 11 by moving the beam 15 in the direction of the arms 17. It may move upwardly and downwardly, or in a substantially vertical direction, by moving the member 13 upwardly and downwardly along its guideway on the frame 11.

The beam 19 carries two or more holders 21 and 23, one or more of which may hold a guiding or tracing stylus assembly, and one or more of which may hold a rotary cutting tool. If desired, the holders themselves may be of identical construction, and the tracing stylus assemblies and the cutting tool assemblies may be of similar external form and dimensions, so that either the tracing stylus assembly or the cutting tool assembly can be placed, as desired, in any one of the holders. In the illustrative embodiment here shown, the holder 21 carries a tracing stylus assembly as will be described in greater detail hereafter while the holder 23 carries a cutting tool assembly indicated in general at 27, this assembly having a cutting tool 29 rotated by any suitable means such as by the belt 31 driven in any known manner from a source of power such as an electric motor.

The machine also includes a frame part or standard 35 carrying a horizontal slide 37 movable in one direction, which in turn carries another horizontal slide 39 movable in a direction transverse to the movement of the first slide, and this second slide 39 supports a table 41 on which may be mounted the model or pattern 43 to be copied, and the work piece 45 on which a reproduction of the pattern is to be made.

The mounting of the tracing stylus and the cutting tool on the same beam, as here shown by way of example, is suitable for making a reproduction on the same scale. When the reproduction is to be made on a reduced or enlarged scale, then the movements of the beam may be controlled by a pantograph linkage of known form, in known manner, and the tracing stylus may be mounted on the pantograph linkage while the cutting tool is mounted on the beam, or vice versa, or again, both the tracing stylus and the cutting tool may be mounted on different parts of any suitable pantograph linkage. The tracing stylus assembly of the present invention is not necessarily used on a beam, the beam arrangement here illustrated being shown simply by way of example, and the tracing stylus assembly of the present invention is of general applicability whenever a tracing stylus is to be used in a copying milling machine or the like.

During the final or finishing milling operation, it is usually preferred to operate the tracing stylus over the pattern by direct hand pressure, applied either directly to the stylus or to the beam or pantograph linkage on which it is mounted. During the earlier rough cutting or milling operation, however, much useless fatigue of the operator can be avoided if feeding means is provided for moving the stylus and the cutter over the pattern and the work, respectively, without the necessity of direct hand pressure This rough milling may be accomplished by holding the beam 19 stationary and by moving the pattern and the work relatively to the stylus and cutter by operating the screw feeds controlling the slides 37 and 39, but preferably it is accomplished by leaving the table 41 stationary and providing suitable feeding means for moving the beam 19. For example, the frame 11 may be provided with a forward extension 51 on which is mounted a horizontal slide 53 movable in a direction from front to back of the machine, its movement being controlled by the screw feed 55. On this slide 53 is a second horizontal slide 57 movable in a direction transverse to the slide 53 and controlled by the screw feed 59. The slide 57 is connected as by means of a link 61 to some suitable part of the beam 19 or of the cutting tool assembly 27, so that movements of the slide 57 are imparted to the beam and thus to the tracing stylus and the cutting tool, the connection being such that the beam 19 may move vertically independently of the connection 61.

If desired, a power feed of any suitable known form may be substituted for the hand screw feeds 55 and 59. The extension 51 on the frame may carry an electric motor 63 to drive either the cutting tool, or the power feeds, or both.

During the rough cutting operation, the operator moves the beam 19 by means of the hand or power feeds, rather than by direct hand pressure. This not only saves much energy on the part of the operator, but also avoids subjecting his hand to the effect of such vibration as may be present in the beam 19 and associated parts. During the movements of the beam 19 by the feeding means, however, it is important that he be able to ascertain quickly and easily whether or not the tracing stylus is in contact with the pattern or model, so that he may continue the feeding movement in the same direction if the stylus is not yet in contact with the pattern, or may discontinue the feeding movement before breakage or damage to the pattern results, if the tracing stylus has come into contact therewith. When the stylus has come into contact with the pattern, it is also important for the operator to know the direction of the contacting pressure between the stylus and the pattern, in order that he may know in which direction he should operate the feeding means. When the stylus and cutting tool are moved by hand or power feeding means rather than by direct hand pressure, the sense of touch cannot be relied upon to inform the operator accurately of the fact of contact or of the direction or extent of the contacting pressure. The knowledge of these important factors is readily communicated to the operator by means of the improved tracing stylus assembly of the present invention, now to be described.

Referring now to Figs. 3, 4, and 5 of the drawings, the assembly includes a main outer sleeve or tube 71 secured in any suitable manner in the holder in which the stylus is to be mounted, such as the holder 21 on the beam 19. A second sleeve 73 is mounted in the sleeve 71 and projects below the lower end thereof. The tracing stylus itself, indicated at 75, is of any suitable form or shape depending on the requirements of the work or of the pattern, and is inserted in a sleeve 77, the lower end of which is longitudinally slotted at 79 and on which is screwed a clamping nut 81 having a conical or tapered portion so that when the nut is screwed up, the lower end of the sleeve 77 is contracted to clamp firmly on the tracing stylus 75 in the manner of a collet chuck. By releasing the clamping nut 81, the tracing stylus 75 may be removed from the sleeve 77 and another tracing stylus of different shape or form may be substituted.

The sleeve 77 is provided with a spherical zone 85 which is seated on a spherical zone seat at the lower end of the sleeve 73, and held thereon by a nut 87, so that the parts constitute in effect a ball and socket joint, by means of which the sleeve 77 and tracing stylus 75 may tilt in any direction relatively to the sleeves 71 and 73, about the center of rotation indicated at 89. The upper part of the sleeve 77, above the ball and socket joint, is somewhat smaller than the internal diameter of the sleeve 73, so that limited tilting movement of the sleeve 77 in the sleeve 73 is possible, the extent of such movement being limited by an inwardly projecting annular shoulder 91 on the sleeve 73 near the upper end of the sleeve 77.

Around the upper reduced end of the sleeve 77 are arranged a series of radially extending spring plunger holders 93, each having, as shown in Fig. 4, a spring plunger 95 pressed radially inwardly by a spring 97. These various plungers act upon the upper reduced end of the sleeve 77 to hold this sleeve normally in a central position in the sleeve 73, but pressure in any lateral direction on the lower end of the tracing stylus 73 is able to move the upper end of the sleeve 77 in an opposite lateral direction, by compressing the springs 97 of the plungers on that side of the sleeve 71 toward which the sleeve 77 moves.

In the sleeve 71, above the sleeve 73, is a sleeve 101 screwed into the upper end of the sleeve 73. Between the lower end of the sleeve 101 and a suitable shoulder on the sleeve 73 are a pair of transverse plates 103 having alined apertures substantially at their centers, formed to provide a seat for a spherical ball 105 secured to a vertical rod 107, to form a ball and socket joint so that the rod 107 may tilt in any lateral direction. The lower end of the rod 107 is somewhat enlarged or made with an approximately spherical ball, and fits with close clearance into a bushing 109 mounted tightly in the upper end of the sleeve 77. The upper end of the rod 107 above the ball 105 is much longer than the lower end below the ball and the upper end terminates at 113 just beneath a transparent top plate or cover plate 115 (such as a plate of glass) closing the upper end of the sleeve 101.

When the lower end of the stylus 75 is deflected laterally in any direction by contact with the pattern, this will cause corresponding movement of the upper end of the sleeve 77 and of the bushing 109, which will move the short lower end of the rod 107 and cause a corresponding but greatly magnified deflection of the upper end 113 of the rod. Although the permissible lateral deflection of the lower end of the tracing stylus 75, as limited by the shoulder 91, is of very small extent, the magnifying or leverage effect caused by the great length of the upper arm of the rod 107 in comparison to the lower arm thereof, results in a large and readily observable lateral deflection of the upper end 113 of the rod 107. It is apparent that the direction in which the upper end 113 will be deflected from its normal central position, will be the same as the direction of deflection of the lower end of the tracing stylus 75. Thus the operator, by observing the upper end 113, will be notified not only of the fact that the tracing stylus is in contact with the pattern, but also of the direction of the contacting pressure, and he can observe the degree or magnitude of the contacting pressure, by observing the extent to which the upper end 113 has been deflected from its normal central position.

To aid the operator in observing the conditions, the upper end 113 of the rod 107 is preferably very brightly colored in order to be easily observable, and the transparent plate 115 is preferably provided with a series of suitable reference marks or graduations, such for example, as a series of circles 121, 123, and 125 concentric with each other and with the normal undisplaced position of the upper end 113 of the rod 107. When the upper end of the rod is in normal or central position, it is centrally located with respect to the concentric circular markings, as indicated in Fig. 5. The circles 121 and 123 may indicate between them the zone to which the end 113 should be deflected in any direction when the stylus is contacting with the pattern with the normal proper degree of pressure to complete or finish the rough cutting of the work. That is, when the end 113 is deflected to a position between the circles 121 and 123, this indicates the "correct" deflection of the tracing stylus which corresponds to the working clearance or allowance customary when completing a rough cutting or rough milling operation. When the end 113 is deflected beyond the circle 123, to the position of the circle 125, for example, then the operator knows that the tracing stylus is pressing too heavily against the pattern and that the cutting tool may be cutting too deeply or beyond the clearance or allowance permissible for the rough cutting operation. Similarly, if the end 113 is visible within the circle 121, the operator knows that the stylus is not yet pressing against the pattern hard enough to produce the "correct" deflection, and further pressure is needed before the rough cutting operation is completed.

If desired, the annular space between the "normal" or "correct" circles 121 and 123 may be shaded, or rendered opaque, or otherwise suitably treated to emphasize the zone defined by these circles. If this zone be rendered opaque, then when the end 113 is deflected to the normal or correct extent, it will be beneath this opaque zone and will not be visible, so that whenever the end 113 is visible the operator will know that it is deflected either too much or too little for proper completion of the rough cutting operation.

If the upper end of the tracing stylus assembly is too high for the operator to look downwardly upon it conveniently, or if it is otherwise placed in a location where it is inconvenient for the operator to see it, one or more mirrors may be arranged at an angle over the transparent plate 115, as indicated diagrammatically at 127, so that the operator may readily observe conditions by looking at the mirror.

The above described arrangement is of great advantage in copying "relief" patterns, that is, patterns having three dimensional surfaces, and is a great aid not only in assuring proper conformance between the work and the pattern at the end of the rough cutting operation, but also in preventing excessive lateral pressure of the stylus against the pattern, which might break off small projecting parts of the pattern. It is seen that this arrangement notifies the operator not only of the fact of engagement of the stylus with the pattern, but also of the direction of the engaging pressure, and of the degree or magnitude of such pressure, the latter two of these indications being of great value to the operator in properly operating the copying machine.

The tracing stylus assembly of the form described above is especially suitable for giving indications where the stylus comes into lateral contact with upwardly projecting parts of the pattern. When the pattern has surfaces which are horizontal or at a very slight slope to the horizontal, then it may be desirable to modify the construction of the stylus assembly so as to give the operator an indication of vertical contact or pressure between the stylus and the pattern, instead of merely lateral contact or pressure as in the form just described. The assembly may then be constructed as disclosed in Figs. 6 and 7, in which the sleeve 77 which carries the tracing stylus 75, instead of being mounted with a ball and socket joint directly in the lower end of the sleeve 73, is mounted with a ball and socket joint at the lower end of a sleeve 131 slidable vertically in the sleeve 73 and constantly pressed downwardly by a coiled spring 133. Radial studs 135 mounted in and spaced circumferentially around the sleeve 73 have inner ends projecting into vertical slots in the sleeve 131, and prevent the sleeve from dropping downwardly out of the sleeve 73, also limiting upward movement of the sleeve when upward pressure is exerted on the lower end of the stylus 75. The annular shoulder 91 which limits the lateral deflection of the upper end of the sleeve 77 is mounted on the upper end of the sleeve 131 instead of on the sleeve 73.

A pin 137 slidable vertically through the partition plates 103 and spaced from the rod 107, rests at its lower end on the top of the bushing 109 fixed in the upper end of the sleeve 77. The upper end of the pin 137 presses against a short arm 141 of a bell crank lever pivoted at 143 to one side of the sleeve 101. This lever has an upwardly extending long arm 145, the upper end of which is just beneath the transparent plate 115, and which swings back and forth close to one side of the space within the sleeve 101, and out of the way of deflection of the upper end 113 of the rod 107.

Downward pressure of the tracing stylus assembly on the pattern will compress the spring 133 and cause upward deflection of the stylus and of the parts 77 and 131, which will raise the pin 137 and swing the upper end of the bell crank arm 145 through a greatly magnified extent because of the leverage effect. By observing the position of the upper end of the arm 145, the operator will be notified not only of the fact of vertical engagement of the stylus with the pattern, but also of the extent or magnitude of the engaging pressure, and this will not interfere in any way with the lateral deflection of the tracing stylus and the indication thereof by the upper end 113 of rod 107.

The transparent plate 115 may be provided with suitable markings or graduations to cooperate with the upper end of the arm 145, in a manner similar to the markings 121, 123, and 125 above described. For example, as shown in Fig. 7 the plate 115 may have lines marking out the zone along which the arm 145 sweeps, and cross lines 151, 153, and 155 similar to the lines 121, 123, and 125. The lines 151 and 153 may indicate between them the "normal" or "correct" extent of deflection, as in the case of the lines 121 and 123, and the space between these two lines may be shaded or rendered opaque for the same purpose mentioned in connection with the lines 121 and 123. The upper end of the arm 145 is preferably brightly colored to be readily visible, but preferably is of a color different from that of the end 113 of the rod 107, so as to be readily distinguishable therefrom at a glance.

Except for the changes above described, the construction illustrated in Figs. 6 and 7 may be identical with that described in connection with Figs. 3, 4 and 5, and the same reference numerals used in Figs. 3, 4, and 5 have been employed to denote the corresponding parts in Figs. 6 and 7, which need not be further described.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A copying machine including stylus holding means, a tracing stylus mounted in said holding means and movable bodily over a pattern, said stylus being displaceable relatively to said holding means through a limited range, resilient means tending to maintain said stylus in normal undisplaced position relatively to said holding means, visible pointer means displaceable universally in any direction in one plane from a central position, means operated by displacement of said stylus from said normal position for displacing said pointer means in a corresponding direction, so that by observing the direction in which said pointer means has been displaced an operator can tell in what direction said stylus has been displaced, and a cutting tool operatively connected to said stylus for corresponding movement over work.

2. A tracing stylus assembly for use on copying machines and the like, said assembly including hollow body means, a stylus holder mounted in said body means for limited movement relative thereto, said holder being arranged to receive a stylus in one end, the other end of said holder having an opening therein, and indicating means including a rod mounted in said body means and having one end engaged in said opening in said stylus holder, and means fulcruming said rod near said end thereof, so that when said stylus holder moves laterally relative to said body means, it will cause lateral displacement of said end of said rod and magnified lateral movement of the remote end of said rod.

3. A tracing stylus assembly for use on copying machines and the like, said assembly including body means, a stylus mounted on said body means for limited movement relative thereto in any direction in one plane from a central position, resilient means tending to hold said stylus in said central positive relative to said body means and tending to resist displacement from said position, and pointer means pivotally mounted on said body means, said pointer means including a lever mounted for universal movement in any direction in one plane and having a short arm operatively connected to said stylus to be moved when said stylus is displaced from said position and having a longer arm moved by said short arm to give a magnified indication of the direction and extent of said displacement of said stylus.

4. A tracing stylus assembly for use on copying machines and the like, said assembly including body means, a stylus mounted on said body means for limited movement relative thereto both laterally and longitudinally, means tending to hold said stylus in a predetermined undisplaced position relative to said body means, pointer means including a movement magnifying lever for indicating lateral displacement of said stylus relative to said body means, and other pointer means including a movement magnifying lever for indicating longitudinal displacement of said stylus relative to said body means.

5. A tracing stylus assembly for use on copying machines and the like, said assembly including body means, a stylus mounted on said body means for limited movement relative thereto in any direction in one plane from a central position, means tending to hold said stylus in said central position relative to said body means, said body means including a transparent member, and pointer means including a lever mounted for universal movement in any direction in one plane and operatively connected to said stylus to be moved thereby to indicate both the direction and extent of displacement of said stylus from said undisplaced position, said pointer means including a portion within said body means visible through said transparent member.

6. A construction as described in claim 5, further including a ring marked on said transparent member approximately concentric with the apparent position of said pointer means when said stylus is in said central position, to serve as a reference marking to indicate when said stylus is displaced to a normal extent from said undisplaced position.

7. A construction as described in claim 5, further including light reflecting means arranged exteriorly of said transparent member in alinement therewith and at an angle thereto, to reflect in a lateral direction an image of said pointer means as seen through said transparent member.

8. A tracing stylus assembly for use on copying machines and the like, said assembly including upright hollow tubular body means, a stylus mounted in and projecting downwardly below said body means for limited movement relative thereto, pointer means including an upright rod pivotally mounted within said hollow body means and operatively connected near its lower end to said stylus for mechanically indicating the movements thereof relative to said body means by lateral displacement of the upper end of said rod, and mirror means mounted on said body means adjacent the upper end thereof for reflecting an image of the upper end of said pointer means in a lateral direction, so that the position of said pointer means may be readily observed by an operator stationed laterally away from said tracing stylus assembly.

9. A tracing stylus assembly for use on copying machines and the like, said assembly including a body, a stylus member pivotally mounted on said body for tilting movement in any direction about a point intermediate the ends of said stylus member, a reference mark on said body, and a movable indicating member mechanically connected to said stylus member and having a readily visible portion movable relatively to said reference mark in a direction and to an extent corresponding to the direction and extent of tilting movement of said stylus member, for mechanically giving a visual indication of said direction and extent of stylus tilting movement.

10. A construction as described in claim 9, in which said movable indicating member is in the form of a lever separate from said stylus member and mounted for tilting movement in any direction about a point intermediate its ends and having one short arm connected to said stylus member and one arm of much greater length with its end adjacent said reference mark, for giving a substantially magnified indication of the extent of stylus tilting movement.

11. A tracing stylus assembly for use on copying machines and the like, said assembly including a tubular body, a stylus member mounted on said body for endwise movement relative to said body and carrying a stylus projecting from one end of said body, spring means within said body tending to move said stylus member outwardly with respect to said body, a plate of at least partially transparent material extending across and substantially closing the opposite end of said body, a reference mark on said plate, and a movable indicating member in the form of a lever separate from said stylus member and pivotally mounted within said tubular body and having one relatively short arm acted upon and moved by endwise movement of said stylus member and one arm of much greater length with its end adjacent said reference mark and movable relatively to said reference mark for mechanically giving, by its position with respect to said reference mark, a substantially magnified visual indication of the extent of endwise stylus movement.

12. A copying machine including a tracing stylus for movement over a pattern, a cutting tool operatively connected to said stylus for corresponding movement over work, said stylus being mounted for lateral movement universally in any lateral direction, and means including a lever coupled to said stylus and mounted for limited tilting movement in any direction about a fulcrum remote from said stylus, for indicating the direction of contacting pressure between the stylus and the pattern.

13. A copying machine including a tracing stylus for movement over a pattern, a cutting tool operatively connected to said stylus for corresponding movement over work, said stylus being mounted for lateral movement universally in any lateral direction, and mechanical means including a lever coupled to said stylus and mounted for limited tilting movement in any direction about a fulcrum remote from said stylus, for giving a visual indication of the direction of contacting pressure between the stylus and the pattern directly by visual observation of the direction of movement of a predetermined portion of said lever.

14. A tracing stylus assembly for use on copying machines and the like, said assembly including a tracing stylus for movement over a pattern, said stylus being mounted for limited tilting movement in any direction about a fulcrum intermediate its ends, and means including a lever coupled to said stylus and mounted for limited tilting movement in any direction about a fulcrum remote from the fulcrum of said stylus for indicating both the direction and the magnitude of contacting pressure between the stylus and the pattern directly by visual observation of the direction and extent of movement of a predetermined portion of said lever.

15. A tracing stylus assembly for use on copying machines and the like, said assembly including body means of approximately hollow cylindrical form, a stylus mounted on said body means and pivoted about a fulcrum near one end of said body means for limited lateral tilting movement in any direction relative thereto, and indicating means in the form of a lever mounted in said hollow body means for lateral tilting movement in any direction about a fulcrum intermediate the ends of said lever and remote from the fulcrum of said stylus, one end of said lever being operatively coupled to said stylus to be operated by movement of said stylus relative to said body means, the other end of said lever extending adjacent to and being observable at the other end of said hollow body means for indicating the direction of said relative movement of said stylus.

16. A tracing stylus unit for use on copying machines and the like, said unit including upright hollow tubular body means, a stylus assembly mounted in and projecting downwardly below said body means and fulcrumed at a point intermediate its ends for limited lateral tilting movement in any direction relative to said body means, pointer means including an upright rod pivotally mounted within said hollow body means for limited lateral tilting movement in any direction about a fulcrum intermediate its ends, said pointer means being operatively connected near its lower end to said stylus assembly for indicating the movements thereof relative to said body means by lateral displacement of the upper end of said rod, and mirror means mounted on said body means adjacent the upper end thereof for reflecting an image of the upper end of said rod in a lateral direction so that the position of said upper end of said rod may be readily observed by an operator stationed laterally away from said tracing stylus unit.

KURT ZWICK.